US012763317B2

(12) United States Patent
Hinojosa et al.

(10) Patent No.: US 12,763,317 B2
(45) Date of Patent: Oct. 13, 2026

(54) BIPOLAR BATTERY PLATE AND FABRICATION THEREOF

(71) Applicant: Gridtential Energy, Inc., Santa Clara, CA (US)

(72) Inventors: Esteban M. Hinojosa, San Jose, CA (US); Collin Kwok Leung Mui, Mountain View, CA (US)

(73) Assignee: Gridtential Energy, Inc., Santa Clara, CA (US)

( * ) Notice: Subject to any disclaimer, the term of this patent is extended or adjusted under 35 U.S.C. 154(b) by 139 days.

(21) Appl. No.: 18/273,172

(22) PCT Filed: Jan. 25, 2022

(86) PCT No.: PCT/US2022/013702
§ 371 (c)(1),
(2) Date: Jul. 19, 2023

(87) PCT Pub. No.: WO2022/164802
PCT Pub. Date: Aug. 4, 2022

(65) Prior Publication Data

US 2024/0105914 A1 Mar. 28, 2024

Related U.S. Application Data

(60) Provisional application No. 63/141,712, filed on Jan. 26, 2021.

(51) Int. Cl.
*H01M 4/20* (2006.01)
*H01M 4/02* (2006.01)
*H01M 4/04* (2006.01)

(52) U.S. Cl.
CPC ........... *H01M 4/20* (2013.01); *H01M 4/0404* (2013.01); *H01M 4/043* (2013.01); *H01M 2004/029* (2013.01)

(58) Field of Classification Search
CPC ...... H01M 4/20; H01M 4/0404; H01M 4/043; H01M 2004/029
See application file for complete search history.

(56) References Cited

U.S. PATENT DOCUMENTS 3,016,413 A 1/1962 Solomon et al.
3,819,412 A 6/1974 Taylor et al.
(Continued)

FOREIGN PATENT DOCUMENTS

AU 2014268373 9/2017
CA 2825921 A1 5/2017
(Continued)

OTHER PUBLICATIONS

"U.S. Appl. No. 13/994,434, Examiner Interview Summary mailed Apr. 2, 2014", 3 pgs.
(Continued)

*Primary Examiner* — James M Mellott
(74) *Attorney, Agent, or Firm* — Schwegman, Lundberg & Woessner, P.A.

(57) ABSTRACT

Apparatus and techniques described herein can be used to provide a bipolar battery plate with lower resistance as compared to other approaches. In an example, a bipolar plate comprises a conductive current collector substrate with lead-containing surfaces on both sides, onto which active materials are applied. Interfaces with low contact resistance can be created between the active materials and the current collector substrate by a combination of mechanical, thermo-chemical, and electrochemical techniques. Specifically, the present subject matter can include a bipolar plate fabricated by applying "wet," (e.g., uncured) active materials to the current collector, and performing a curing procedure such
(Continued)

that a corrosion layer with low contact resistance is formed between the active materials and the underlying surfaces of the current collector.

19 Claims, 8 Drawing Sheets

(56) References Cited

U.S. PATENT DOCUMENTS

| | | | |
|---|---|---|---|
| 3,982,960 A | 9/1976 | Hoekje et al. | |
| 4,098,967 A | 7/1978 | Biddick et al. | |
| 4,324,848 A | 4/1982 | Will | |
| 4,687,717 A * | 8/1987 | Kaun | H01M 10/399 429/247 |
| 4,828,939 A | 5/1989 | Turley et al. | |
| 5,156,932 A | 10/1992 | Dougherty et al. | |
| 5,279,909 A | 1/1994 | Horner et al. | |
| 5,298,683 A | 3/1994 | Taylor | |
| 5,302,472 A | 4/1994 | Ando et al. | |
| 5,379,502 A * | 1/1995 | Feldstein | H01M 4/73 29/2 |
| 5,470,679 A | 11/1995 | Lund et al. | |
| 5,595,839 A | 1/1997 | Hossain | |
| 5,837,601 A | 11/1998 | Matsumoto | |
| 5,916,709 A | 6/1999 | Arias et al. | |
| 5,948,562 A | 9/1999 | Fulcher et al. | |
| 6,077,623 A | 6/2000 | Grosvenor et al. | |
| 6,210,826 B1 | 4/2001 | Dopp et al. | |
| 6,432,577 B1 | 8/2002 | Shul et al. | |
| 6,500,585 B1 | 12/2002 | Saakes et al. | |
| 7,473,488 B2 | 1/2009 | Knight et al. | |
| 7,479,466 B2 | 1/2009 | Lu et al. | |
| 8,597,817 B2 | 12/2013 | Faust | |
| 8,633,373 B2 | 1/2014 | Greiff et al. | |
| 8,828,582 B2 | 9/2014 | Borden | |
| 9,184,471 B2 | 11/2015 | Lev | |
| 9,570,737 B2 | 2/2017 | Borden | |
| 9,634,319 B2 | 4/2017 | Faust | |
| 9,812,713 B2 | 11/2017 | Mui et al. | |
| 10,008,713 B2 | 6/2018 | Mui et al. | |
| 10,044,042 B2 | 8/2018 | Mui et al. | |
| 10,090,515 B2 | 10/2018 | Mui et al. | |
| 10,290,904 B2 | 5/2019 | Borden | |
| 10,312,549 B2 | 6/2019 | Fairchild et al. | |
| 2007/0111090 A1 | 5/2007 | Cardenas-valencia et al. | |
| 2007/0139001 A1 | 6/2007 | Hahn | |
| 2007/0269718 A1 | 11/2007 | Krause et al. | |
| 2008/0090129 A1 | 4/2008 | Kunz et al. | |
| 2008/0292953 A1 | 11/2008 | Hosaka et al. | |
| 2009/0061319 A1 | 3/2009 | Kim et al. | |
| 2010/0062335 A1 | 3/2010 | Datta | |
| 2010/0255371 A1 | 10/2010 | Takayama et al. | |
| 2010/0310923 A1 | 12/2010 | Ogg et al. | |
| 2010/0330411 A1 | 12/2010 | Nam et al. | |
| 2011/0014520 A1 | 1/2011 | Ueda | |
| 2011/0083966 A1 | 4/2011 | Kirchev | |
| 2011/0141618 A1 | 6/2011 | Wallash et al. | |
| 2011/0223467 A1 | 9/2011 | Shacklette et al. | |
| 2011/0305927 A1 | 12/2011 | Lev et al. | |
| 2012/0155082 A1 | 6/2012 | Ramer et al. | |
| 2012/0183847 A1 | 7/2012 | Lev et al. | |
| 2013/0026409 A1 | 1/2013 | Baker et al. | |
| 2013/0065105 A1 | 3/2013 | Faust | |
| 2013/0065106 A1 | 3/2013 | Faust | |
| 2013/0130096 A1* | 5/2013 | Lev | H01M 4/21 29/623.5 |
| 2014/0072868 A1 | 3/2014 | Lev | |
| 2014/0079985 A1 | 3/2014 | Borden | |
| 2014/0349172 A1* | 11/2014 | Mui | H01M 4/14 429/163 |
| 2014/0370369 A1 | 12/2014 | Borden | |
| 2016/0028071 A1 | 1/2016 | Lev | |
| 2016/0308195 A1 | 10/2016 | Mui et al. | |
| 2016/0329535 A1 | 11/2016 | Moomaw et al. | |
| 2016/0359164 A1 | 12/2016 | Mui et al. | |
| 2017/0200980 A1 | 7/2017 | Borden | |
| 2018/0047992 A1 | 2/2018 | Mui et al. | |
| 2018/0069222 A1 | 3/2018 | Shaffer, II et al. | |
| 2018/0219227 A1 | 8/2018 | Moomaw et al. | |
| 2019/0393559 A1 | 12/2019 | Eskra et al. | |

FOREIGN PATENT DOCUMENTS

| | | | | |
|---|---|---|---|---|
| CN | 1523690 A | 8/2004 | | |
| CN | 101558512 A | 10/2009 | | |
| CN | 102056861 A | 5/2011 | | |
| CN | 103493250 A | 1/2014 | | |
| CN | 105594021 A | 5/2016 | | |
| CN | 103493250 B | 8/2016 | | |
| CN | 105958003 A | 9/2016 | | |
| CN | 105958003 B | 12/2018 | | |
| CN | 105594021 B | 7/2019 | | |
| CN | 117242597 | 12/2023 | | |
| EP | 2487739 A1 | 8/2012 | | |
| EP | 2613381 B1 | 9/2016 | | |
| EP | 3032610 B1 | 1/2019 | | |
| EP | 2613393 B1 | 8/2019 | | |
| GB | 1394694 A | 5/1975 | | |
| GB | 2278712 A * | 12/1994 | | H01M 10/18 |
| IN | 11639DELNP2015 A | 5/2016 | | |
| IN | 201617025763 A | 8/2016 | | |
| IN | 202317054924 | 8/2023 | | |
| JP | 60101867 A | 6/1985 | | |
| JP | 61283173 A | 12/1986 | | |
| JP | 05135761 A | 6/1993 | | |
| JP | H05135761 A | 6/1993 | | |
| JP | 06048169 A | 2/1994 | | |
| JP | 07142054 A | 6/1995 | | |
| JP | 08241707 A | 9/1996 | | |
| JP | 2006040722 A | 2/2006 | | |
| JP | 2007335198 A | 12/2007 | | |
| JP | 2007335206 A | 12/2007 | | |
| JP | 4796585 B2 | 10/2011 | | |
| JP | 2012004068 A | 1/2012 | | |
| JP | 2013054826 A | 3/2013 | | |
| JP | 2014507774 A | 3/2014 | | |
| JP | 5634623 B2 | 10/2014 | | |
| JP | 2015028954 A | 2/2015 | | |
| JP | 2016522972 A | 8/2016 | | |
| JP | 6058609 B2 | 12/2016 | | |
| KR | 1020090012472 A | 2/2009 | | |
| KR | 1020090093191 A | 9/2009 | | |
| KR | 1020130114736 A | 10/2013 | | |
| KR | 101590529 B1 | 2/2016 | | |
| KR | 1020160017108 A | 2/2016 | | |
| KR | 1020160024876 A | 3/2016 | | |
| KR | 1020160121517 A | 10/2016 | | |
| KR | 10-1702414 | 1/2017 | | |
| TR | 201602987 T4 | 4/2016 | | |
| TW | 284921 B | 9/1996 | | |
| TW | 202240961 A | 10/2022 | | |
| TW | I823239 | 11/2023 | | |
| WO | WO-2008059529 A1 | 5/2008 | | |
| WO | WO-2011109477 A2 | 9/2011 | | |
| WO | WO-2012155082 A1 | 11/2012 | | |
| WO | WO-2014190282 A1 | 11/2014 | | |
| WO | WO-2015103295 A1 | 7/2015 | | |
| WO | WO-2015103304 A1 | 7/2015 | | |
| WO | WO-2015127081 A1 | 8/2015 | | |
| WO | WO-2022164802 A1 | 8/2022 | | |

OTHER PUBLICATIONS

"U.S. Appl. No. 13/994,434, Final Office Action mailed Apr. 15, 2014", 9 pgs.

"U.S. Appl. No. 13/994,434, Non Final Office Action mailed Dec. 31, 2013", 12 pgs.

"U.S. Appl. No. 13/994,434, Notice of Allowance mailed Jun. 24, 2014", 7 pgs.

"U.S. Appl. No. 13/994,434, Preliminary Amendment filed Jun. 14, 2013", 7 pgs.

(56) References Cited

OTHER PUBLICATIONS

"U.S. Appl. No. 13/994,434, Response filed Mar. 27, 2014 to Non Final Office Action mailed Dec. 31, 2013", 12 pgs.
"U.S. Appl. No. 13/994,434, Response filed May 16, 2014 to Final Office Action mailed Apr. 15, 2014", 10 pgs.
"U.S. Appl. No. 14/286,523, Corrected Notice of Allowance mailed Aug. 10, 2017", 2 pgs.
"U.S. Appl. No. 14/286,523, Corrected Notice of Allowance mailed Sep. 26, 2017", 2 pgs.
"U.S. Appl. No. 14/286,523, Non Final Office Action mailed Nov. 9, 2016", 12 pgs.
"U.S. Appl. No. 14/286,523, Non-Final Office Action mailed Nov. 9, 2016", 12 pgs.
"U.S. Appl. No. 14/286,523, Notice of Allowance mailed Jul. 26, 2017", 7 pgs.
"U.S. Appl. No. 14/286,523, Response filed Apr. 27, 2017 to Non Final Office Action mailed Nov. 9, 2016", 9 pgs.
"U.S. Appl. No. 14/286,523, Response filed Aug. 30, 2016 to Restriction Requirement mailed Jun. 30, 2016", 6 pgs.
"U.S. Appl. No. 14/286,523, Restriction Requirement mailed Jun. 30, 2016", 9 pgs.
"U.S. Appl. No. 14/477,312, Notice of Allowance mailed Oct. 28, 2016", 9 pgs.
"U.S. Appl. No. 14/477,312, Preliminary Amendment filed Sep. 22, 2014", 7 pgs.
"U.S. Appl. No. 14/477,312, Preliminary Amendment filed Oct. 18, 2016", 3 pgs.
"U.S. Appl. No. 14/667,240, Notice of Allowance mailed Apr. 21, 2016", 9 pgs.
"U.S. Appl. No. 15/109,402, Preliminary Amendment filed Jun. 30, 2016", 9 pgs.
"U.S. Appl. No. 15/197,346, Non Final Office Action mailed Jan. 16, 2018", 6 pgs.
"U.S. Appl. No. 15/197,346, Notice of Allowance mailed Jul. 13, 2018", 7 pgs.
"U.S. Appl. No. 15/197,346, Response filed Apr. 16, 2018 to Non Final Office Action mailed Jan. 16, 2018", 7 pgs.
"U.S. Appl. No. 15/197,346, Response filed Oct. 27, 2017 to Restriction Requirement mailed Aug. 28, 2017", 7 pgs.
"U.S. Appl. No. 15/197,346, Restriction Requirement mailed Aug. 28, 2017", 8 pgs.
"U.S. Appl. No. 15/242,206, Notice of Allowance mailed Feb. 28, 2018", 8 pgs.
"U.S. Appl. No. 15/413,692, Non Final Office Action mailed Aug. 14, 2018", 10 pgs.
"U.S. Appl. No. 15/413,692, Notice of Allowance mailed Jan. 28, 2019", 5 pgs.
"U.S. Appl. No. 15/413,692, Preliminary Amendment filed Jan. 27, 2017", 6 pgs.
"U.S. Appl. No. 15/413,692, Response filed Nov. 14, 2018 to Non Final Office Action mailed Aug. 14, 2018", 7 pgs.
"U.S. Appl. No. 15/793,277, Corrected Notice of Allowability mailed Jul. 6, 2018", 2 pgs.
"U.S. Appl. No. 15/793,277, Notice of Allowance mailed Mar. 26, 2018", 7 pgs.
"U.S. Appl. No. 15/793,277, Notice of Allowance mailed Jun. 25, 2018", 5 pgs.
"Australian Application Serial No. 2014268373, First Examiner Report mailed Jun. 21, 2016", 3 pgs.
"Australian Application Serial No. 2014268373, Response filed Apr. 27, 2017 to First Examiner Report mailed Jun. 21, 2017", 22 pgs.
"Canadian Application Serial No. 2,825,921, Office Action mailed Jan. 20, 2015", 8 pgs.
"Canadian Application Serial No. 2,825,921, Office Action mailed Oct. 20, 2015", 3 pgs.
"Canadian Application Serial No. 2,825,921, Office Action mailed Nov. 2, 2016", 4 pgs.
"Canadian Application Serial No. 2,825,921, Response filed Nov. 9, 2015 to Office Action mailed Oct. 20, 2015", 15 pgs.
"Canadian Application Serial No. 2,825,921, Response filed Nov. 17, 2016 to Office Action mailed Nov. 2, 2016", 19 pgs.
"Canadian Application Serial No. 2,825,921,Response filed Jul. 7, 2015 to Office Action mailed Jan. 20, 2015", 19 pgs.
"Canadian Application Serial No. 2,913,059, Office Action mailed Jan. 5, 2017", 4 pgs.
"Canadian Application Serial No. 2,913,059, Office Action mailed May 29, 2018", 4 pgs.
"Canadian Application Serial No. 2,913,059, Office Action mailed Sep. 5, 2017", 4 pgs.
"Canadian Application Serial No. 2,913,059, Response filed Mar. 2, 2018 to Office Action mailed Sep. 5, 2017", w/ Amended Claims, 14 pgs.
"Canadian Application Serial No. 2,913,059, Response filed May 5, 2017 to Office Action mailed Jan. 5, 2017", 22 pgs.
"Canadian Application Serial No. 2,948,737, Office Action mailed Dec. 27, 2017", 5 pgs.
"Canadian Application Serial No. 2,948,737, Response filed Jun. 25, 2018 to Office Action mailed Dec. 27, 2017", w/ English Claims, 20 pgs.
"Chinese Application Serial No. 201280009851.1, Office Action mailed Apr. 22, 2015", w/ English Translation, 12 pgs.
"Chinese Application Serial No. 201280009851.1, Office Action mailed Aug. 31, 2015", w/ English Translation, 2 pgs.
"Chinese Application Serial No. 201280009851.1, Response filed Jan. 15, 2016 to Office Action mailed Aug. 31, 2015", with English translation of claims, 10 pgs.
"Chinese Application Serial No. 201280009851.1, Response filed Jul. 15, 2015 to Office Action mailed Apr. 22, 2015", w/ English Claims, 41 pgs.
"Chinese Application Serial No. 201280009851.1, Voluntary Amendment filed May 9, 2014"; w/English specification and claims, 29 pgs.
"Chinese Application Serial No. 201480040601.3, Office Action mailed Mar. 28, 2018", w/ English translation, 13 pgs.
"Chinese Application Serial No. 201480040601.3, Office Action mailed May 25, 2017", w/English Translation, 15 pgs.
"Chinese Application Serial No. 201480040601.3, Response filed Nov. 17, 2017 to Office Action mailed May 25, 2017", w/ Amended English Claims, 11 pgs.
"Chinese Application Serial No. 201610407652.6, Office Action mailed Dec. 21, 2017", with English translation of claims, 12 pgs.
"Chinese Application Serial No. 201610407652.6, Response filed May 7, 2018 to Office Action mailed Dec. 21, 2017", w/ English Claims, 9 pgs.
"European Application Serial No. 12722634.8, Examination Notification Art. 94(3) mailed Dec. 11, 2014", 5 pgs.
"European Application Serial No. 12722634.8, Office Action mailed Mar. 27, 2014", 6 pgs.
"European Application Serial No. 12722634.8, Office Action mailed Jun. 8, 2015", 6 pgs.
"European Application Serial No. 12722634.8, Response filed Aug. 1, 2014 to Office Action mailed Mar. 27, 2014", 13 pgs.
"European Application Serial No. 12722634.8, Response filed Apr. 13, 2015 to Examination Notification Art. 94(3) mailed Dec. 11, 2014", 15 pgs.
"European Application Serial No. 14733438.7, Communication Pursuant to Article 94(3) EPC mailed Mar. 7, 2018", 10 pgs.
"European Application Serial No. 14733438.7, Communication pursuant to Rules 161(1) and 162 EPC mailed Jan. 21, 2016", 2 pgs.
"European Application Serial No. 14733438.7, Response filed Jul. 13, 2018 to Communication Pursuant to Article 94(3) EPC mailed Mar. 7, 2018", w/ English Claims, 21 pgs.
"European Application Serial No. 14733438.7, Response filed Jul. 22, 2016 to Communication pursuant to Rules 161(1) and 162 EPC mailed Jan. 21, 2016", 19 pgs.
"European Application Serial No. 15198173.5, Extended European Search Report mailed Mar. 30, 2016", 9 pgs.
"European Application Serial No. 15198173.5, Response filed Dec. 12, 2016 to Extended European Search Report mailed Mar. 30, 2016", 17 pgs.
"Indian Application Serial No. 6863/DELNP/2013, First Examiner Report mailed May 11, 2018", 6 pgs.

(56) References Cited

OTHER PUBLICATIONS

"International Application Serial No. PCT/US2012/037598, International Preliminary Report on Patentability mailed Jul. 23, 2013", 12 pgs.
"International Application Serial No. PCT/US2012/037598, International Search Report mailed Jul. 23, 2012", 3 pgs.
"International Application Serial No. PCT/US2012/037598, Written Opinion mailed Jul. 23, 2012", 17 pgs.
"International Application Serial No. PCT/US2012/037598, Written Opinion mailed Jul. 23, 2012", 8 pgs.
"International Application Serial No. PCT/US2012/037598, Written Opinion of the International Preliminary Examining Authority, mailed Apr. 18, 2013", 6 pgs.
"International Application Serial No. PCT/US2014/039379, International Preliminary Report on Patentability mailed Dec. 3, 2015", 9 pgs.
"International Application Serial No. PCT/US2014/039379, International Search Report mailed Aug. 29, 2014", 3 pgs.
"International Application Serial No. PCT/US2014/039379, Written Opinion mailed Aug. 29, 2014", 7 pgs.
"International Application Serial No. PCT/US2014/072804, International Preliminary Report on Patentability mailed Jul. 14, 2016", 11 pgs.
"International Application Serial No. PCT/US2014/072804, International Search Report mailed Apr. 23, 2015", 3 pgs.
"International Application Serial No. PCT/US2014/072804, Written Opinion mailed Apr. 23, 2015", 9 pgs.
"International Application Serial No. PCT/US2014/072824, International Preliminary Report on Patentability mailed Jul. 14, 2016", 9 pgs.
"International Application Serial No. PCT/US2014/072824, International Search Report mailed Mar. 24, 2015", 2 pgs.
"International Application Serial No. PCT/US2014/072824, Written Opinion mailed Mar. 24, 2015", 7 pgs.
"International Application Serial No. PCT/US2015/016622, International Preliminary Report on Patentability mailed Sep. 1, 2016", 9 pgs.
"International Application Serial No. PCT/US2015/016622, International Search Report mailed May 20, 2015", 2 pgs.
"International Application Serial No. PCT/US2015/016622, Written Opinion mailed May 20, 2015", 7 pgs.
"Japanese Application Serial No. 2013-552743, Office Action mailed Jan. 21, 2014", w/ English Translation, 4 pgs.
"Japanese Application Serial No. 2013-552743, Office Action mailed May 20, 2014", w/English translation, 4 pgs.
"Japanese Application Serial No. 2013-552743, Response filed Apr. 21, 2014 to Office Action mailed Jan. 21, 2014", w/English claims, 13 pgs.
"Japanese Application Serial No. 2013-552743, Response filed Aug. 18, 2014 to Office Action mailed May 20, 2014", w/English claims, 9 pgs.
"Japanese Application Serial No. 2014-209992, Office Action mailed Apr. 26, 2016", with English translation of claims, 5 pgs.
"Japanese Application Serial No. 2014-209992, Office Action mailed Dec. 15, 2015", with English translation, 8 pgs.
"Japanese Application Serial No. 2014-209992, Response filed Mar. 28, 2016 to Office Action mailed Dec. 15, 2015", with English translation of claims, 6 pgs.
"Japanese Application Serial No. 2014-209992, Response filed Oct. 19, 2016 to Office Action mailed Apr. 26, 2016", 7 pgs.
"Japanese Application Serial No. 2016-515119, Office Action mailed May 22, 2018", w/English Translation, 6 pgs.
"Korean Application Serial No. 10-2015-7036444, Office Action mailed Aug. 23, 2016", w/ Office Action Summary in English, 10 pgs.
"Korean Application Serial No. 10-2013-7021903, Office Action mailed Feb. 9, 2015", w/ English Claims, 15 pgs.
"Korean Application Serial No. 10-2013-7021903, Response filed Aug. 7, 2015 to Office Action mailed Feb. 9, 2015", w/ English Claims, 27 pgs.
"Korean Application Serial No. 10-2016-7002096, Office Action mailed Apr. 14, 2016", with English translation of claims, 10 pgs.
"Korean Application Serial No. 10-2016-7002096, Response filed Jun. 14, 2016 to Office Action mailed Apr. 14, 2016", (English Translation of Claims), 16 pgs.
"Korean Application Serial No. 1020157036444, Response filed Feb. 22, 2017 to Office Action mailed Aug. 23, 2016", w/ English Claims, 29 pgs.
Ottaviani, G, et al., "Reliability and degradation: Mechanisms and interfacial layers in silicide formation", John Wiley & Sons Ltd, (1981), 105-149.
Zuo, Wenhua, et al., "Battery-Supercapacitor Hybrid Devices: Recent Progress and Future Projects", Adv. Sci. 4, 1600539, [Online]. Retrieved from the Internet: <URL: https://www.ncbi.nlm.nih.gov/pmc/articles/PMC5514976/pdf/ADVS-4-na.pdf>, (2017), 1-21.
"International Application Serial No. PCT/US2022/013702, International Search Report mailed Apr. 22, 2022", 4 pgs.
"International Application Serial No. PCT/US2022/013702, Written Opinion mailed Apr. 22, 2022", 7 pgs.
"Taiwanese Application Serial No. 111103289, First Office Action mailed Oct. 4, 2022", w/ English translation, 21 pgs.
"Indian Application Serial No. 202317054924, First Examination Report mailed Oct. 6, 2025", 6 pgs.
"Chinese Application Serial No. 202280016754.9, Office Action mailed Jul. 30, 2026", w/ English translation, 16 pgs.

* cited by examiner

BIPOLAR BATTERY PLATE AND FABRICATION THEREOF

CLAIM OF PRIORITY

This patent application is a U.S. National Stage Application under 35 U.S.C. 371 from International Application No. PCT/US2022/013702, filed Jan. 25, 2022, and published as WO 2022/164802 on Aug. 4, 2022, which claims the benefit of priority of Hinojosa et al., U.S. Provisional Patent Application No. 63/141,712, titled "BIPOLAR BATTERY PLATE AND FABRICATION THEREOF," filed on Jan. 26, 2021, the benefit of each of which are hereby presently claimed, and each of which are hereby incorporated by reference herein in their entirety.

FIELD OF THE DISCLOSURE

This document pertains generally, but not by way of limitation, to battery technology, and more particularly, to battery plate fabrication and processing techniques, such as for use in a bipolar battery configuration.

BACKGROUND

The lead acid battery, invented by Gaston Plante in 1859, can be considered the oldest and most common type of secondary (e.g., rechargeable) battery. Applications for lead acid batteries include automotive (e.g., starting, ignition, and lighting), traction (e.g., vehicular drive), and stationary (e.g., back-up power supply) applications. Despite simplicity and low cost, generally-available monopolar lead acid technology has several shortcomings related to architecture and materials used in the battery. For example, generally-available monopolar lead acid batteries have relatively lower energy densities as compared to other chemistries such as lithium ion partly because the lead alloy grids do not contribute to energy storage capacity. Also, cycling performance of lead acid batteries is often poor under high-current-rate or deep discharge conditions. In addition, lead acid batteries may suffer from poor partial-state-of-charge performance, and often have high self-discharge rates relative to other technologies.

As mentioned above, performance characteristics of monopolar lead acid batteries can be attributable at least in part to the architecture of such batteries, as well as the materials used in monopolar lead acid batteries, more generally. As electrochemical current generated at different locations across a pasted monopolar plate flows across the grid to a current connection tab, an ohmic drop may develop within the grid, resulting in a nonuniform current density distribution. This effect may be pronounced when the battery is charged and discharged at high current rates or when the battery is in a deep discharge state. This nonuniform current density distribution may accelerate certain failure mechanisms, including "sulfation," which refers to irreversible capacity loss due to sulfate crystal formation in an active material paste, or "stratification," in which denser electrolyte sinks to the bottom of the battery. Various other performance degradation mechanisms can exist within a monopolar lead acid battery configuration, such as side reactions associated with other elements alloyed in a lead acid current collector grid.

SUMMARY OF THE DISCLOSURE

A bipolar battery architecture offers improvements over a monopolar battery configuration. In a bipolar configuration, because cells are arranged electrically in series to multiply the cell voltage, current flows in a direction generally perpendicular to the surface of the plates. Fabrication of a bipolar battery generally involves forming a bipolar current collector to provide a substrate material (e.g., a conductive substrate). Positive and negative active materials are applied to at least a portion of opposite surfaces of the bipolar current collector to provide a bipolar plate or "biplate." Generally, multiple bipolar plates are compressed and stacked alternately with separators to establish individual cell compartments, which are to be isolated from each other. Each cell compartment is populated with electrolyte (e.g., a liquid or gel electrolyte), and the battery stack can be formed to activate the cathode and anode materials. In the bipolar configuration, the current collector itself (e.g., the conductive substrate) provides inter-cell electrical connection, with the anode of one cell conductively coupled to the cathode of the next cell on the opposite side of the bipolar current collector via the current collector substrate.

The present subject matter can be used to provide a bipolar plate with improved (e.g., lower) resistance as compared to other approaches. In an example, a bipolar plate comprises a current collector substrate with lead alloy surfaces on both sides, onto which active materials are applied. Interfaces with low contact resistances can be created between the active materials and the current collector substrate one or more mechanical, thermochemical, or electrochemical techniques. Specifically, the present subject matter can include a bipolar plate fabricated by applying "wet," (e.g., uncured) active materials to the current collector, and performing a curing procedure such that a corrosion layer with low contact resistance is formed between the active materials and the underlying surfaces of the current collector.

In an example, a bipolar battery plate can be processed, such as to have at least one active material layer. A method for such processing can include treating a first surface of a conductive substrate, the first surface comprising lead or a lead alloy, depositing a first wet active material paste upon a specified portion of the treated first surface, the first wet active material comprising lead or a lead oxide, and curing the first wet active material paste to provide an electrode having first conductivity type for the bipolar battery plate. The first wet active material paste can be pattered before, during, or after deposition upon the treated first surface.

In another example, a method for processing a bipolar battery plate can include treating a first surface of a conductive substrate, the first surface comprising lead or a lead alloy, treating a second surface of the conductive substrate opposite the first surface, the second surface comprising lead or a lead alloy, depositing a first wet active material paste upon a specified portion of the treated first surface, the first wet active material comprising lead, depositing a different second wet active material paste upon a specified portion of the treated second surface, the second wet active material comprising lead dioxide, and curing the first wet active material paste and the second wet active material paste, such as contemporaneously, to provide a first battery electrode having a first conductivity type upon the first surface and a second battery electrode having an opposite second conductivity type upon the second surface.

In another example, a method for processing a bipolar battery plate can include forming a conductive substrate, forming an ohmic contact layer upon a first surface of the substrate, forming an adhesion layer upon the ohmic contact layer, the adhesion layer comprising lead or a lead alloy, depositing a first wet active material paste upon a specified portion of the first surface, the first wet active material comprising lead or a lead oxide, the first wet active material paste including a patterned surface or profile, and curing the first wet active material paste including using multiple phases of curing defining different environmental conditions, such as using at least two phases including elevated temperature versus ambient, the curing to provide an electrode having first conductivity type for the bipolar battery plate.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 3A:
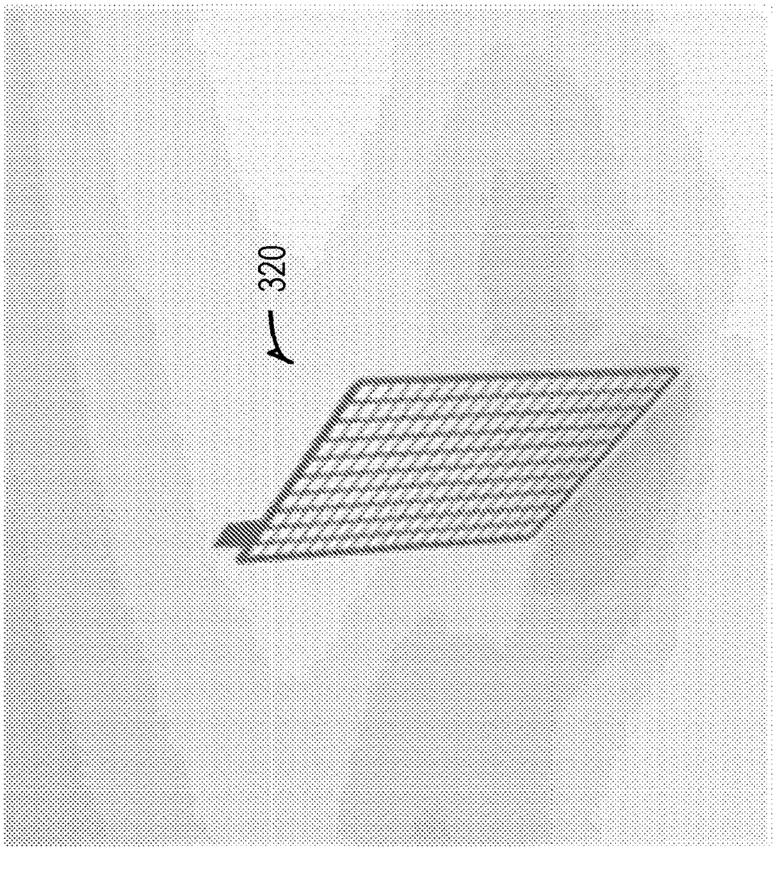
FIG. 3A illustrates generally an example comprising a current collector having a grid configuration, such as can generally be used in a monopolar battery architecture.

As mentioned above, the lead acid battery can be considered the earliest type of rechargeable battery, and lead acid chemistry remains the most commonly-used battery chemistry. The active materials in a lead acid battery generally include lead dioxide ($PbO_2$), lead (Pb), and sulfuric acid ($H_2SO_4$) which also acts as the electrolyte. To assemble a lead acid battery having a monopolar architecture, $PbO_2$ and Pb active materials can be pasted and cured onto monopolar lead current collectors to provide positive and negative plates, from which an electrochemical cell can be formed with $H_2SO_4$ electrolyte. The cells are generally arranged electrically in a parallel configuration such that the voltage of the battery is proportional to the number of cells in the battery pack. Manufacturing of a monopolar lead acid battery may include a few basic operations. The base material for current collector grids may include lead along with elements other than lead metal alone, such as to provide an alloy to improve mechanical properties without affecting electrochemical characteristics. However, alloying elements or compounds may promote side reactions during battery operation. As side reactions compete with the electrochemical reactions of charging and discharge, battery performance can be degraded. After the grids are formed, one of a positive or negative active material is applied (e.g., "pasted") onto respective grids to provide monopolar battery "plates," and the plates are then cured, such as at high temperature. Generally, lead alloy grids are cast as current collectors, such as shown illustratively in FIG. 3A.

Figure 1:
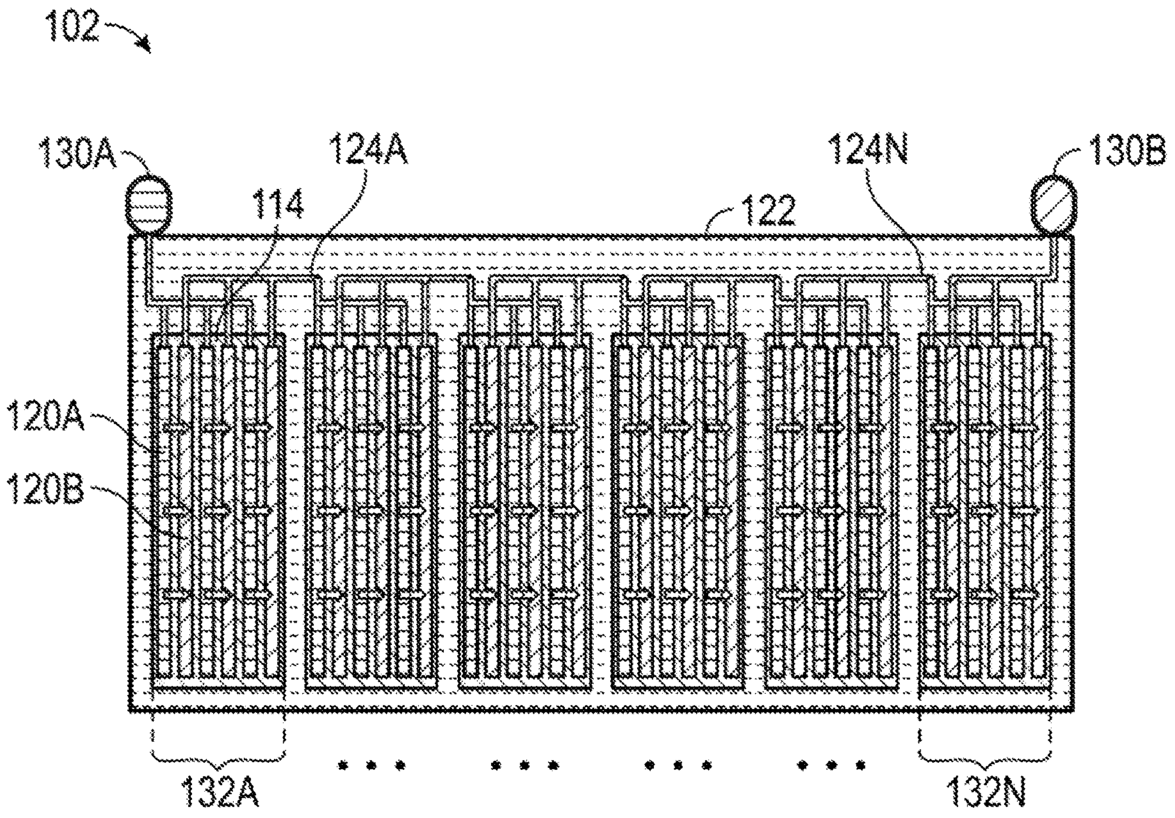
FIG. 1 illustrates generally an example that can include a monopolar battery architecture.

The pasted and cured positive and negative plates can be stacked alternately with separators to form "plate-blocks," which are electrochemical cells with multiple electrodes connected electrically in parallel (see, e.g., FIG. 1). A multi-cell battery may be constructed by connecting multiple plate blocks electrically in series, in which the blocks are compressed and inserted into the battery housing. Then, a "cast-on-strap" process can be used to create intra- and inter-cell connections with lead alloy, such as to suppress corrosion. The battery container can be filled with electrolyte followed by a "formation" process, in which electrical current is used to activate the positive and negative pastes to provide electrochemically active cathode and anode materials.

FIG. 1 illustrates generally an example that can include a monopolar battery architecture. In a monopolar configuration, a current collector generally includes an active material of a single polarity (e.g., positive or negative) applied to both (e.g. opposite) sides of the current collector, such as including application of the active material in paste form. A positive-negative pair can be formed such as including the first plate 120A having a first polarity active material and a second plate 120B having an opposite second polarity active material, to form an electrochemical cell in the electrolyte 114, such as shown illustratively in FIG. 1. In a lead-acid example, such a single-cell voltage can be around 2.1V. Multiple cells can be arranged electrically in parallel configuration as a stack 132A (e.g., a plate block). Individual stacks 132A through 132N can be connected in series to assemble a battery pack 102.

In FIG. 1, a first terminal 130A can provide a first polarity, and a second terminal 130B can provide an opposite second polarity. The first and second terminals 130A and 130B can be coupled to the first stack 132A and last stack 132N, respectively, and the stacks can be coupled together serially using a first bus 124A through an "Nth" bus 124N.

Figure 2A:
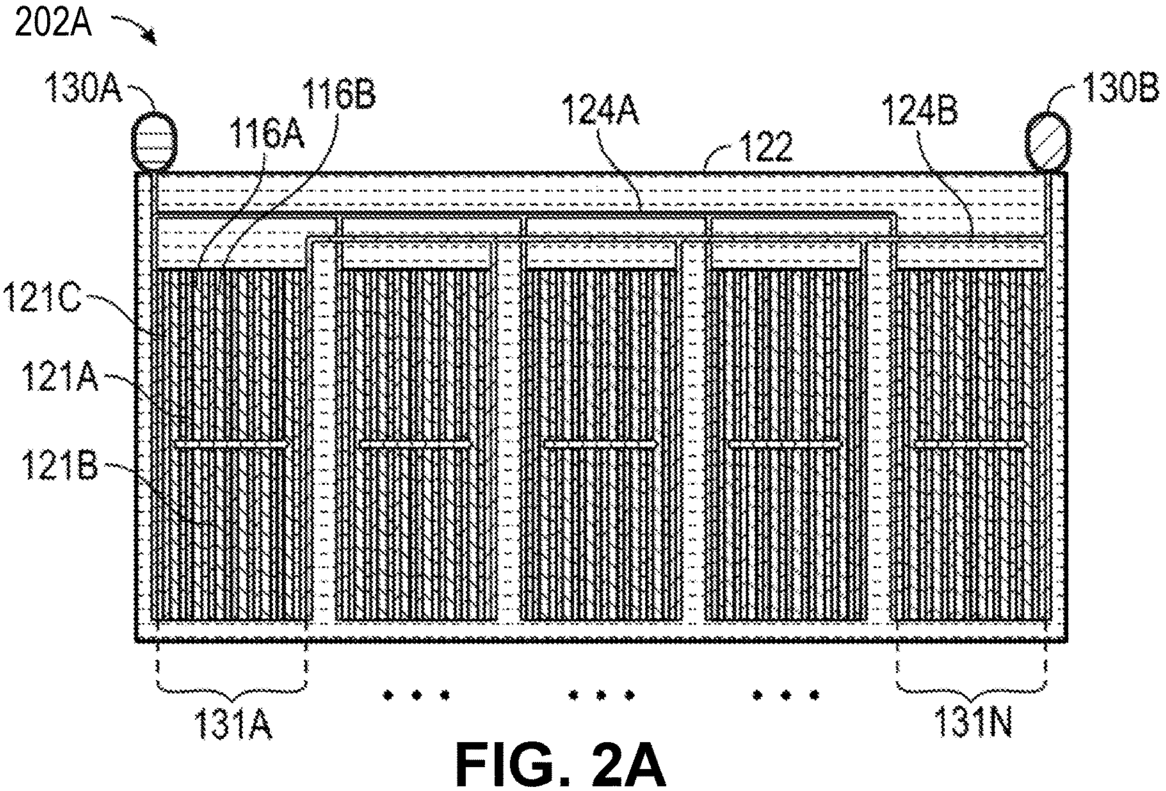
FIG. 2A illustrates generally an example that can include a battery pack having one or more bipolar battery plates, such as arranged in a stacked configuration to provide a bipolar architecture.

By contrast with FIG. 1, a battery bipolar architecture is shown illustratively in FIG. 2A. The bipolar architecture can provide a simpler configuration. Respective positive and negative active materials can be applied, such as through pasting, onto opposite sides of the current collector to form a bipolar plate. FIG. 2A illustrates generally an example that can include a battery pack 202A having one or more bipolar battery plates, such as bipolar plates 121A, 121B, and 121C. The bipolar plates 121A, 121B, or 121C can include different layers on opposite sides of the plate assembly, such as shown and described in other examples herein. Such layers can include different ohmic contact or active material layers. A substrate of the plates, 121A, 121B, 121C can be conductive, such as metallic or comprising a doped semiconductor material, as illustrative examples.

As in FIG. 1, a first terminal 130A can provide a first polarity, and a second terminal 130B can provide an opposite second polarity. The bipolar plates can be sandwiched with electrolyte in regions 116A and 116B, for example, to form sealed cells. In an example, an electrolyte in region 116A can be one or more of fluidically isolated or hermetically sealed so that electrolyte cannot bypass the bipolar plate 121A to an adjacent region such as the electrolyte region 116B, or to suppress or inhibit leakage of electrolyte from the pack 202A. As shown illustratively in FIG. 2A, cells can be disposed in a series configuration. The cells can be aligned to form a stack 131A, and one or more stacks 131A through 131N can be connected internally using a bus 124A and a bus 124B to achieve a specified terminal voltage. The example of FIG. 2A shows multiple interconnected stacks 131A through 131N, but a bipolar architecture need not use a bus 124A or 124B and can include a single stack.

Figure 2B:
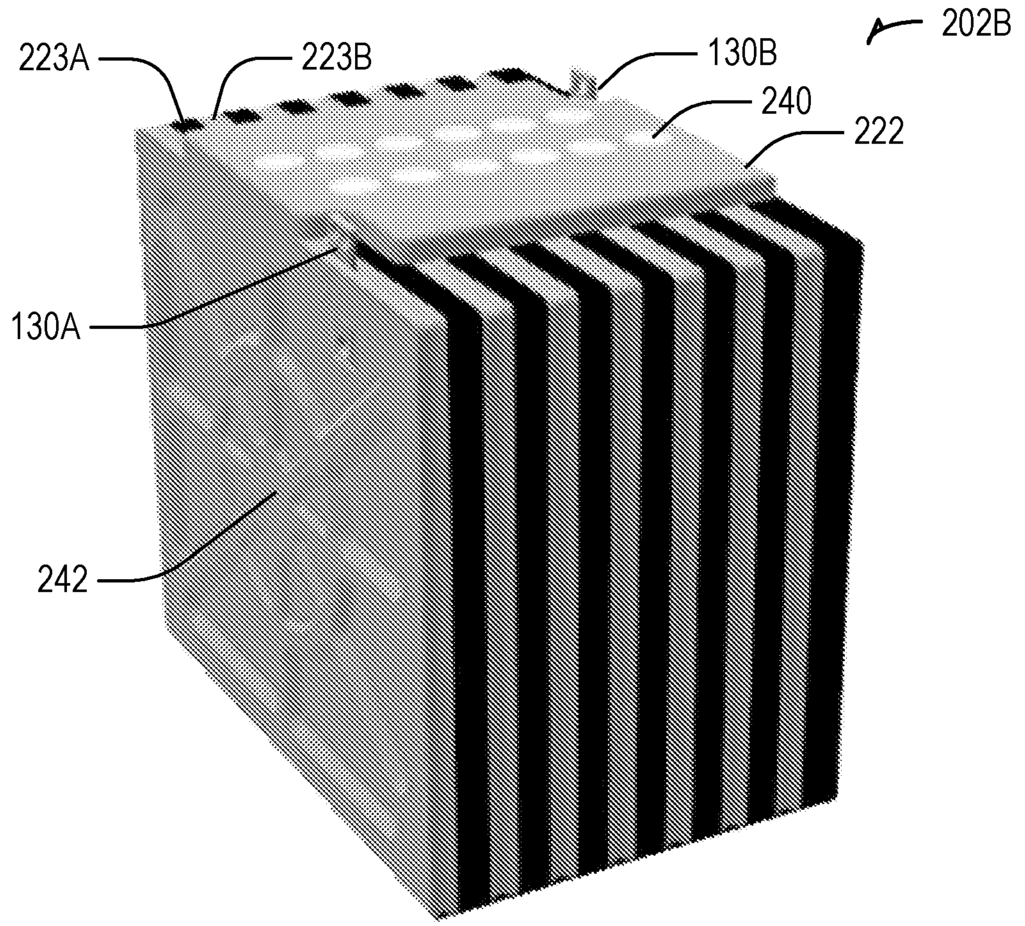
FIG. 2B illustrates generally another example that can include a battery pack having a bipolar architecture including respective casing portions housing respective bipolar battery plates.

For example, FIG. 2A illustrates generally an example that can include a battery pack 202B having one or more bipolar battery plates, such as arranged in a stacked configuration to provide a bipolar architecture. The battery pack 202B can include a single serially-arranged stack of bipolar plates (similar to a single stack 131A as shown in FIG. 2A), without requiring internal bus structures. As an illustrative example, each bipolar plate can be mechanically attached to a casing portion, such as a first bipolar plate supported by a first casing segment 223A (e.g., supported by or even fused with the segment 223A), adjacent to another bipolar plate supported by another casing segment 223B, and so on to establish a specified voltage across terminals 130A and 130B. The terminals can be electrically connected to a conductive end termination, such as shown in FIG. 2B where the terminal 130A is coupled to an end termination located on or within an end casing segment 242. A cavity between adjacent casing segments (or even defined by such casing segments) can include an electrolyte. In configurations where the electrolyte cavities are vented or require access during or after manufacturing, fill or vent caps such as a cap 240 can be located on a panel 222 forming a portion of a housing for the battery pack 202B, providing access to a cavity between adjacent bipolar plates (and corresponding active materials having opposite polarities). Generally, bipolar battery plate processing as described elsewhere in this document, including active material application and active material curing techniques, can be used to provide bipolar plates for the battery pack configurations 202A and 202B, as illustrative examples.

In the bipolar configuration, because cells are arranged electrically in series to multiply the cell voltage, current flows in a direction generally perpendicular to the surface of the plates. Generally, fabrication of a bipolar battery involves forming a bipolar current collector to provide a substrate material (e.g., a conductive substrate). Positive and negative active materials are applied to at least a portion of opposite surfaces of the bipolar current collector to provide a bipolar plate or "biplate." Generally, multiple bipolar plates are compressed and stacked alternately with separators to establish individual cell compartments, which are to be isolated from each other. Each cell compartment is populated with electrolyte (e.g., a liquid or gel electrolyte), and the battery stack can be formed to activate the cathode and anode materials. In the bipolar configuration, the current collector itself (e.g., the conductive substrate) provides inter-cell electrical connection, with the anode of one cell conductively coupled to the cathode of the next cell on the opposite side of the bipolar current collector via the current collector substrate.

The bipolar configurations of FIG. 2A and FIG. 2B can provide advantages as compared to the monopolar configuration of FIG. 1. For example, a bipolar configuration can be simpler because electrical circuits and control systems to regulate the operation of parallel cells in a monopolar battery can be eliminated. As another example, because an entirety or nearly an entirety of a bipolar plate can be used for electrical conduction inside the battery, a higher current density and therefore a higher power delivered can be achieved using a bipolar battery assembly of comparable mass to a corresponding monopolar battery assembly. As another example, lead metal grids are not generally used as current collectors in a bipolar lead acid battery configuration, so a stronger and lighter substrate material for a current collector can provide significant improvement in energy density of the battery.

Generally, as current flows through the current collector in a bipolar battery configuration, current density distribution is largely independent of the size and shape of the current collector and therefore reduced or minimized during high-rate discharge and deep discharge operations as compared to a monopolar configuration. Also, selection of materials for the bipolar current collectors is not limited to lead alloys as in the case of current collector grids, and therefore the substrate material for bipolar current collectors can be specified to satisfy mechanical and electrochemical requirements. Current collectors are generally edge-sealed to isolate each cell compartment, and such a configuration can provide mechanical support for the current collector along its outer edges or circumference. Such support can facilitate a reduction in the mechanical strength specifications of a bipolar plate substrate as compared to monopolar plate.

Figure 3B:
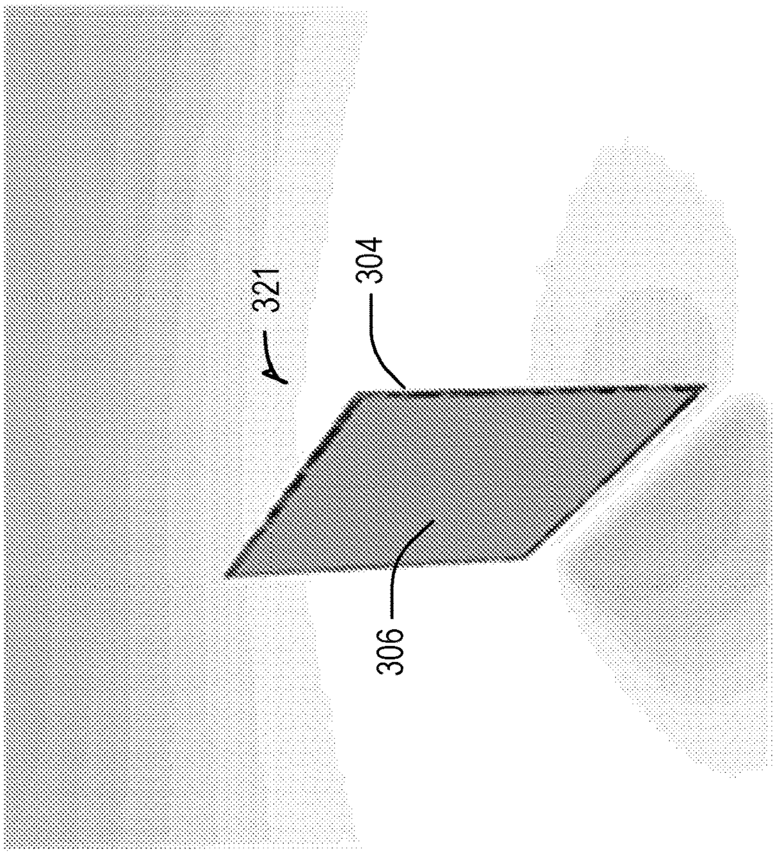
FIG. 3B illustrates generally an example comprising a planar bipolar battery plate, such as having a conductive substrate including opposing surfaces that can support active materials having opposite conductivity types.

As mentioned above, FIG. 3A illustrates generally an example comprising a current collector 320 having a grid configuration, such as can generally be used in a monopolar battery architecture. For example, in a lead acid monopolar battery, a lead-alloy grid current collector 320 is generally supported only by the current tab at the top of the grid. By contrast, FIG. 3B illustrates generally an example comprising a planar bipolar battery plate 321, such as having a conductive substrate 304 including opposing surfaces that can support active materials having opposite conductivity types. The surfaces of the substrate 304 can be treated, such as to include an adhesion layer of lead or a combination of lead and other materials (for example a tin-lead alloy).

In addition to electrical conduction, a current collector substrate 304 generally isolates electrolyte between adjacent cells inside the battery, and generally the materials used for the current collector are specified to suppress or inhibit corrosion when immersed or surrounded in the electrolyte (e.g., $H_2SO_4$) throughout the lifetime of the battery. Electrically, a current collector substrate 304 can be specified to include a high electronic conductivity but a low ionic conductivity such that it acts as a current collector which also isolates an intercell through-diffusion of electrolyte. Chemically, the substrate 304 can be specified to resist $H_2SO_4$ corrosion, and its surface can be specified to be inert towards passivation in $H_2SO_4$. Such unwanted passivation can render the current collector less conductive or non-conductive.

Electrochemically, the bipolar battery plate 321 current collector surface is generally specified to have a wider and more stable potential window as compared to the charge and discharge electrochemical reactions of the battery. Specifically, in the example of a lead acid chemistry, the cathode and anode surfaces are generally specified to have higher oxygen and hydrogen evolution over-potentials than those on $PbO_2$ and Pb, respectively, and the over-potentials are specified to be relatively stable throughout the lifetime of the battery. The high over-potentials can help to reduce or minimize gas evolution due to water electrolysis side reactions at the electrodes. Such side reactions can lead to one or more of coulombic efficiency reduction, active material loss, capacity fade, or premature failure of the battery.

Previous attempts to develop substrate 304 materials for bipolar lead acid batteries suffer from different obstacles. Although lead metal can be used as a substrate 304, lead is a relatively soft metal, and it corrodes in $H_2SO_4$. Most other metals, although electronically conductive, either corrode or passivate in $H_2SO_4$. Composite materials, despite having a wide variety of composition and property options, often suffer from one or more of low electronic or high ionic conductivities. Silicon can be used, such as a substrate 304, for a current collector for a bipolar lead acid battery. For example, silicon wafers are readily available in different sizes and shapes and are widely used in different industries. Mono-crystalline or poly-crystalline silicon are generally impervious to $H_2SO_4$ and can be doped to achieve a specified conductivity. Although an insulating oxide can form on a silicon surface, a variety surface modification processes can be used to provide desired chemical and electrochemical surface properties. For example, a metal silicide can be formed on a silicon surface by annealing a metal thin film deposited on the surface. A metal silicide generally forms a low resistivity ohmic contact with the silicon, protects the underlying silicon from oxidation or passivation, and extends an electrochemical stability window of the surface. One or more thin films can be deposited onto the substrate 304 to enhance its surface properties towards active material adhesion, such as one or more thin films deposited after silicide formation to provide a first surface 306 and a second surface opposite the first surface, suitable for application of an active material. For example, the first surface 306 can include lead or a tin-lead combination.

Figure 4A:
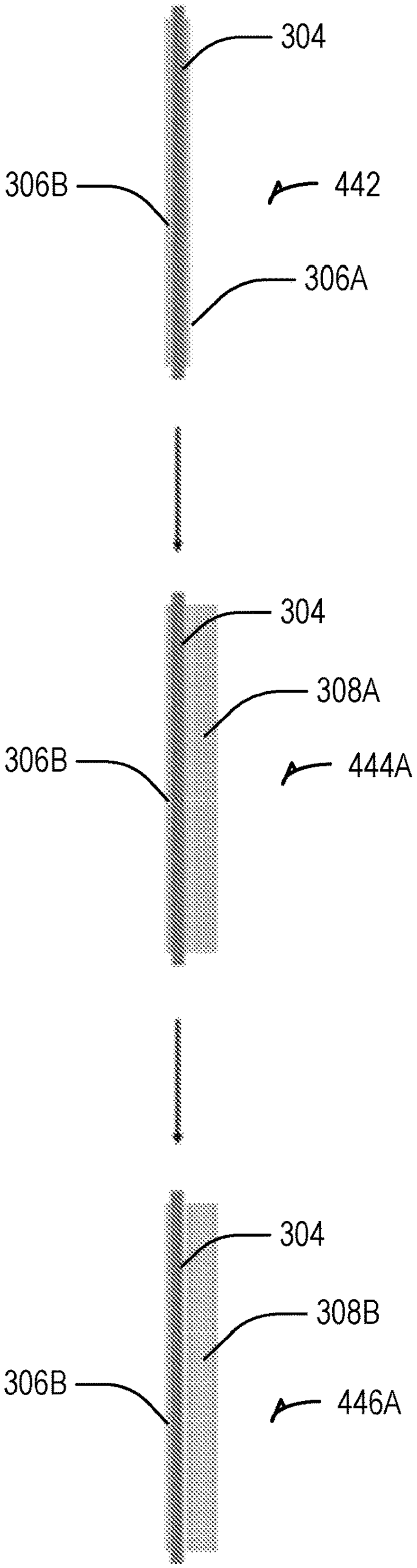
FIG. 4A illustrates generally an example comprising a processing flow, such as can be used to provide an active material on a surface or "side" of a bipolar plate assembly, including application of the active material in paste form.
Figure 4B:
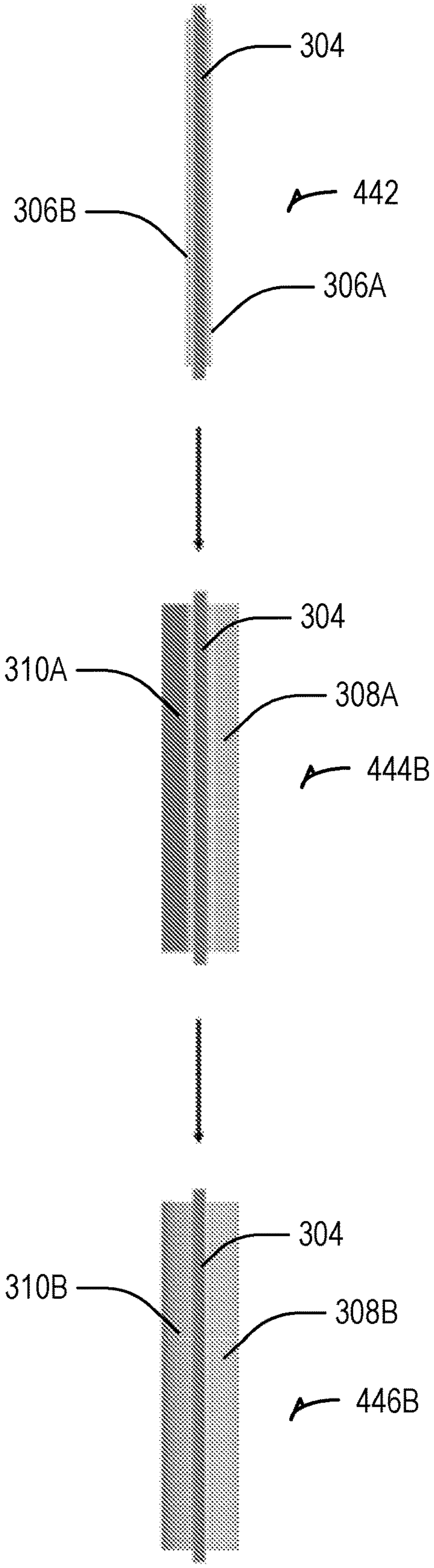
FIG. 4B illustrates generally an example comprising a processing flow, such as can be used to provide respective active material on opposite surfaces or "sides" of a bipolar plate assembly, including application of the active materials in paste form, and optionally including contemporaneously curing the active materials.

FIG. 4A illustrates generally an example comprising a processing flow, such as can be used to provide an active material on a surface or "side" of a bipolar plate assembly, including application of the active material in paste form and FIG. 4B illustrates generally an example comprising a processing flow, such as can be used to provide respective active material on opposite surfaces or "sides" of a bipolar plate assembly, including application of the active materials in paste form, and optionally including contemporaneously curing the active materials.

The present subject matter can be used to provide a bipolar plate with improved (e.g., lower) resistance. In an example, a bipolar plate comprises a current collector substrate 304 with lead alloy surfaces 306A and 306B on both sides, onto which active materials are affixed (e.g., applied or deposited). Interfaces with low contact resistances can be created between the active materials and the current collector substrate by one or more mechanical, thermochemical, and electrochemical techniques. Specifically, the present subject matter can include a bipolar plate fabricated by applying "wet," (e.g., uncured) active material to the current collector, and performing a curing procedure such that a corrosion layer with low contact resistance is formed between the active materials and the underlying surfaces of the current collector.

As an illustrative example, lead oxide, sulfuric acid, and additives can be mixed to provide a paste, which can be stored in a way that will suppress or inhibit evaporation of the water. In one approach, the wet paste is applied to a bipolar current collector substrate (e.g., a treated or untreated substrate). One or more of compression or vibration can be applied to the pasted assembly to encourage a high-surface-area bond. Fixtures or jigs may be used to maintain alignment during this processing. In another approach, a wet paste can be applied to another substrate (e.g., a plastic mesh, a lead grid or other support, a separator, or pasting paper, as illustrative examples). The pasted secondary substrate can then be transferred to a bipolar current collector, and one or more of compression or vibration can be applied to bond the pasted secondary substrate to the current collector. In either approach, an assembly of paste, current collector, and, optionally, fixturing can be transferred to a curing chamber for curing and drying. During this curing and drying step, heat and humidity can be applied to encourage the growth of a chemical connection between the active material and the current collector.

As mentioned above, generally a bipolar current collector comprises a substrate 304, the surfaces of which can be treated to be compatible with lead acid battery electrochemistry. Specifically, the surface physical and chemical properties can be modified to facilitate good electrical contact with active materials. Positive and negative active materials (PAM and NAM) can be prepared by mixing lead metal (e.g., sponge lead) or lead oxide powder, sulfuric acid, and various additives. The composition of the components, especially the types and amounts of various additives, differ for positive and negative active materials. For example, red lead is sometimes added to PAM, whereas carbon additives are common in NAM.

An electrical contact with improved (e.g., lower) resistance can be formed between active materials and the surface of the current collectors when the interface layer has controlled (e.g., low) electrical resistivity and the contact area is enhanced (e.g., maximized). For a negative electrode, the active material generally includes porous lead, which is chemically similar to the lead alloy surface of the current collector. For the positive electrode, the active material is generally porous lead dioxide ($PbO_2$), which is not as conductive as the lead alloy surface of the current collector. The interface layer is therefore a transition region, the composition of which changes from no oxygen ($PbO_x$, x=0) in the bulk alloy to fully oxidized ($PbO_x$, x=2) in the active material. An interface layer at the positive electrode can be formed by a corrosion reaction, in which a combination of acid, air, and water oxidize the current collector surface to form a “corrosion layer” at the interface. A quality of the corrosion layer may depend on the composition of the current collector surface, as well as the properties of the active materials. In one example, the current collector can be treated such that a surface composition facilitates the formation of a corrosion layer of improved (e.g., lower) electrical resistivity. The bulk current collector substrate alloy underneath can have a different composition to minimize degradation during battery cycling. In an example, formulation of the active material can be adjusted such that physical properties facilitate the application, deposition, pasting, and adhesion of the active material onto the surface of the current collector.

Referring to both FIG. 4A and FIG. 4B, one or both surfaces 306A and 306B of the current collector substrate 304 can be provide an adhesion layer, and at 442, such an adhesion layer can be treated, such as selectively physically roughened, polished to smoothen, or stamped to emboss (or a combination of such operations), such as to alter a surface area available for active material adhesion. In addition, or instead, one or both surfaces 306A and 306B of the current collector may be treated in another manner, such as washed with water or solvent to remove dust, contaminants, or impurities, or etched with acid or base materials to dissolve metallic or oxide layers to render the current collector surface chemically suitable for the formation of a suitable corrosion layer. Such treatments need not be restricted to removal of contaminants or impurities and can be used to treat the current collector surface 306A or 306B (or both) to increase surface area or otherwise prepare the current collector surface 306A or 306B (or both) in a manner facilitating adhesion of an active material layer, for example. As mentioned above, the surface 306A or 306B can include an underlying ohmic contact layer, such as a silicide Acids or other reagents can be included with or added to the wet paste such as to encourage adhesion at the interface. Referring to FIG. 4A, a “single sided” pasting process flow, a substrate can be treated, such as etched or roughened, or otherwise processed as mentioned above at 442. An adhesion layer, such as comprising lead or a lead alloy can be applied through one or more of plating, application of a foil, or a coating process. At 444A, a wet active material paste 308A can be applied (either directly or as an assembly comprising paste and a web such as paper or a support), such as using one or more approaches as mentioned elsewhere herein such as below at FIG. 7A or FIG. 7B. For example, the wet active material 308A can be supported by a web or grid, or patterned to relieve stress, such as before application to the substrate 304 at 444A or after such application). At 446A, the applied active material can be cured, such as by baking or otherwise thermally treating the biplate assembly. Such curing can include forming a corrosion layer or low-resistance interface between the bulk of the applied active material 308B and the substrate 304. Referring to FIG. 4B, at 444B, a first wet active material 308A corresponding to a first conductive type can be applied to a first surface of the current collector substrate 304, and a second wet active material 310A having a conductivity type opposite the first wet active material can be applied to a second surface of the current collector substrate 304. At 446B, the first and second wet active materials 308A and 310A can be cured, such as contemporaneously. Such curing can include forming a corrosion layer or low-resistance interface between the cured first and second active materials 308B and 310B and the substrate 304. The curing operation at 446A in FIG. 4A or 446B in FIG. 4B can include use of a specified thermal profile versus time (e.g., having one or more temperature steps, a specified ramp-up rate, a specified ramp-down rate, or combinations thereof, as illustrative examples). As an illustration, two or more phases of curing can be established, such as including exposure of the assembly to an elevated temperature versus ambient.

Generally, to form an interface with controlled (e.g., low) contact resistance between active materials and the current collector surface, a corrosion reaction can be initiated thermochemically during curing or electrochemically during formation, or both. Generally, the current collector with wet active material applied (such as shown at 444A in FIG. 4A or 444B in FIG. 4B), which can be referred to as a “pasted plate,” undergoes a “curing” procedure (such as shown at 446A in FIG. 4A or at 446B in FIG. 4B), in which a combination of controlled heating and humidity can be used to promote thermochemical formation of the corrosion layer. Process parameters, such as temperature, humidity, and duration, can be controlled to facilitate formation of a corrosion layer having specified characteristics. The curing procedure can include multiple phases, such as having different temperature, humidity, or duration. Some phases may vary a process parameter over the duration of the cure phase, such ramping temperature, for example.

Figure 5:
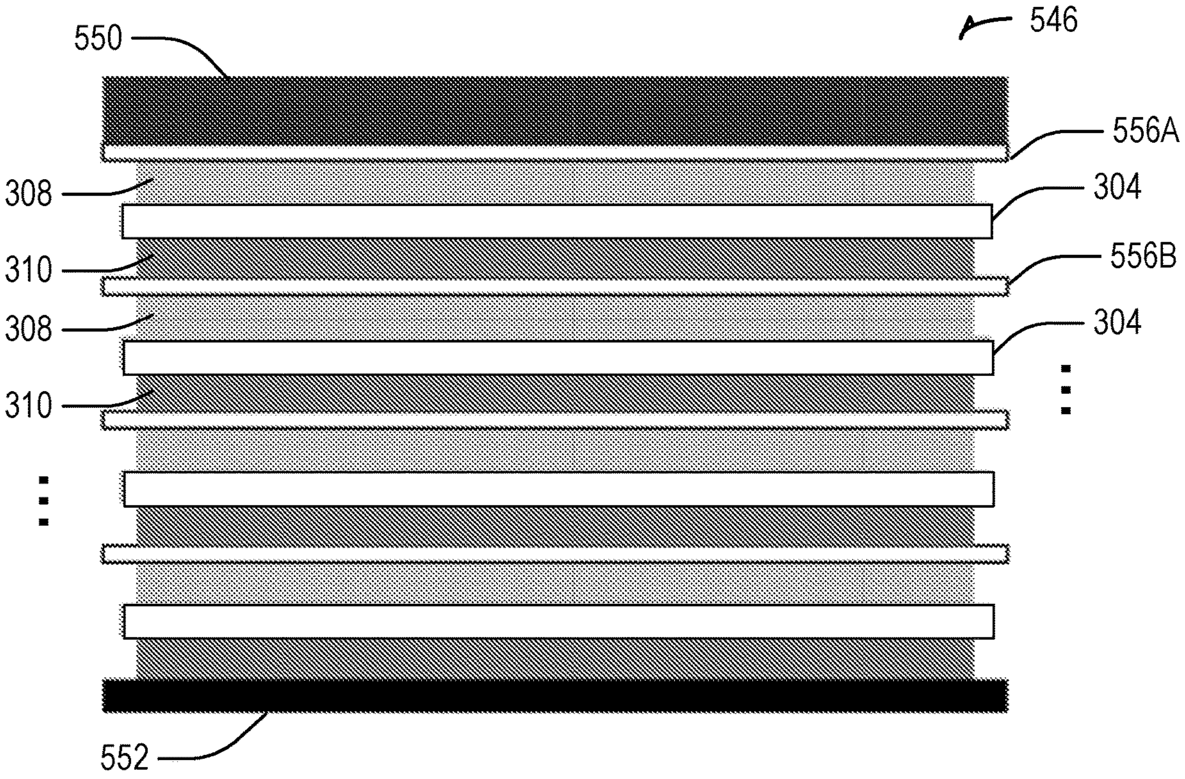
FIG. 5 illustrates generally an example comprising a stacked configuration of bipolar plate assemblies, such as can be used to perform curing of active materials, including applying compression to the stacked configuration over one or more durations, such as before, during, or after thermal treatment.

FIG. 5 illustrates generally an example 546 comprising a stacked configuration of bipolar plate assemblies, such as can be used to perform curing of active materials, including applying compression to the stacked configuration over one or more durations, such as before, during, or after thermal treatment. During the curing process, multiple pasted plates can be arranged such that oxidation reaction rate, availability of dry air, and moisture incorporation into the active materials can be controlled. For example, as shown at FIG. 5, multiple plates are stacked, such as where each plate isolated by impermeable or permeable material, and pressure is applied at the top of the stack. In particular, bipolar plate assembly can be defined as a substrate 304, such as conductive substrate, along with active material layers 308 and 310, on opposite surfaces of the substrate 304. A separator 556A can be provided between a face of a press 550 (such a platen or plate), and separators can be provided between adjacent biplate assemblies such as the separate 556B. The stack can be supported by a base 552, such as a base plate of a press or other surface. A porosity or permeability of separators such as separator 556B can be used to control aspects of the curing process, such as a diffusion or evaporation rate of moisture contained within wet pastes comprising active material layers 308 or 310, for example.

Figure 6:
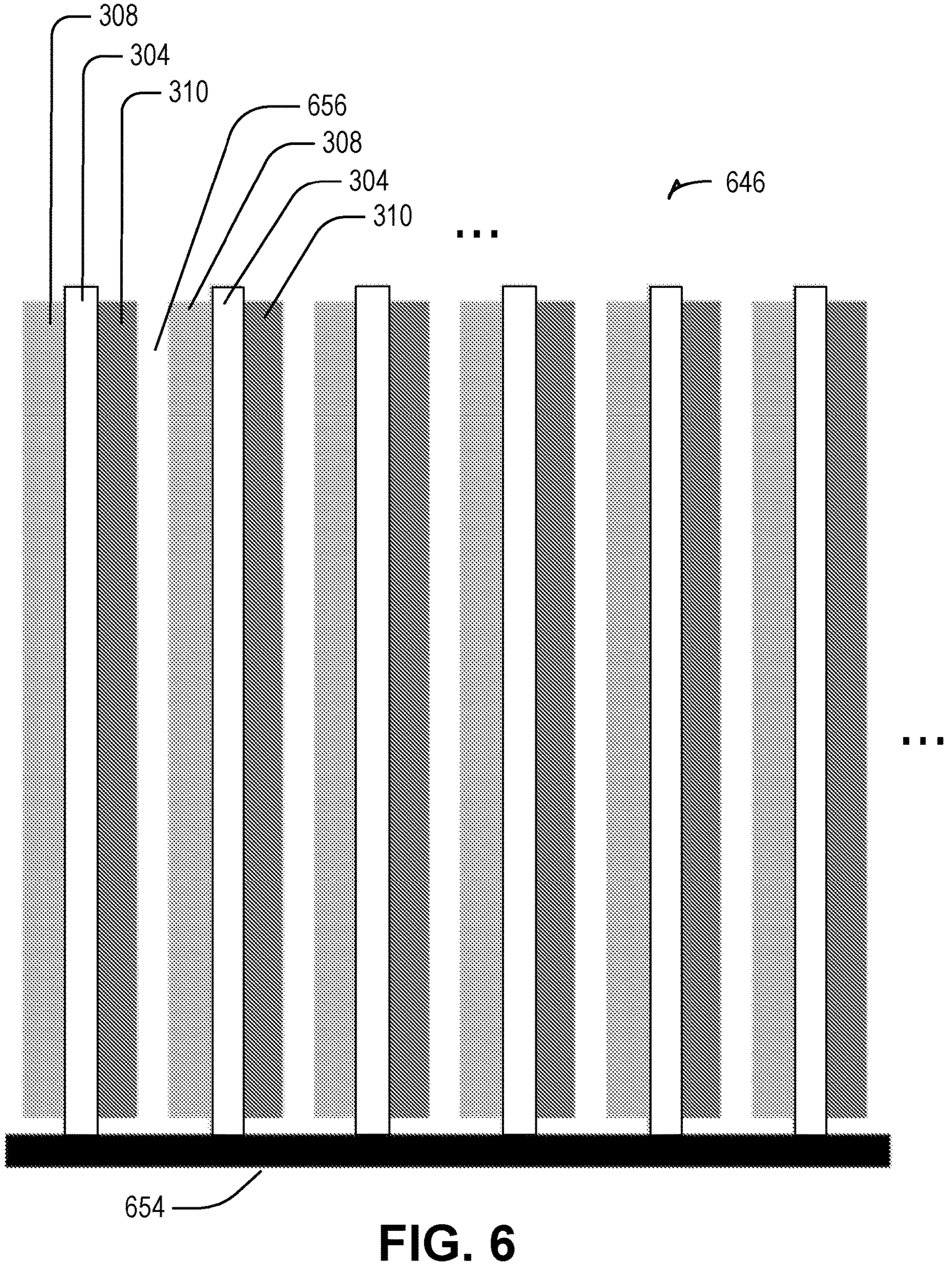
FIG. 6 illustrates generally an example comprising another configuration of bipolar plate assemblies, including a gap between adjacent bipolar plate assemblies, such as can be used to perform curing of active materials.

In another example, multiple plates are arranged in a vertical array. FIG. 6 illustrates generally an example 646 comprising another configuration of bipolar plate assemblies, such as can be used to perform curing of active materials, including a gap between adjacent bipolar plate assemblies. As in the example of FIG. 5, a bipolar plate assembly can include a substrate 304, such as having active material layers 308 and 310 on opposite sides of the substrate 304. A gap 656 can be defined between adjacent bipolar plate assemblies, such as defined in part using features of a base 654 (e.g., a holder including slots or other elements to retain the bipolar plate assembly in a desired orientation, such as a vertical orientation). Parameters of the curing process, including one or more process parameters, or a spatial arrangement of plates, can be established to promote formation of a corrosion layer with chemical bonding between active materials 308 and 310 and current collector surface (e.g., a treated surface of the substrate 304). Use of the vertical orientation in FIG. 6 is merely illustrative, and plate assemblies can be arranged horizontally, such as supported between frames, plates, or other holders, including establishing a gap 656 between adjacent bipolar plate assemblies.

As discussed herein, positive and negative active materials can be applied in a wet paste form and can be cured on opposite surfaces of a current collector substrate, to provide a bipolar plate. A bipolar battery can be built by stacking multiple bipolar plates and separators alternately. The bipolar battery can be filled with an acid electrolyte, followed by a "formation procedure," in which electrical current can be used to drive the electrochemical conversion of the cured (e.g., dried) pastes to function as positive and negative active materials of the battery. The formation can be used to further establish corrosion layers at an interface of one or both the positive and negative active materials and the current collector. In an example, both positive and negative interface layers are formed by a combination of thermochemical and electrochemical energies. In another example, only positive active material is applied wet and cured on one surface of the bipolar current collector. For example, negative active material can be first applied to a support or web and cured separately. To provide the bipolar battery assembly, a cured-on positive plate, separator, and cured negative plate are stacked and sealed. The bipolar battery is then filled with acid, such as followed by a formation procedure. In this example, the positive corrosion layer is formed thermochemically during curing and electrochemically during formation, whereas the negative corrosion layer is formed electrochemically without requiring thermochemical formation.

The present inventors have also recognized, among other things, that it is possible that the paste drying and curing process will impose tensile stress on the underlying substrate. The present inventors have recognized that, to reduce or mitigate damage or reliability impact from such stress, a paste layer can be patterned such that the cohesion of the paste layer is regulated to reduce the overall tensile stress after application and curing. For example, a paste layer can be patterned on the substrate such that the overall paste layer possesses stress-relief features. "Patterning" can be achieved by using a rectangular grid template during pasting, or by separating the pasted layer on the substrate before the curing procedure. Two variations in such patterning are shown illustratively in FIG. 7A and FIG. 7B.

Figure 7A:
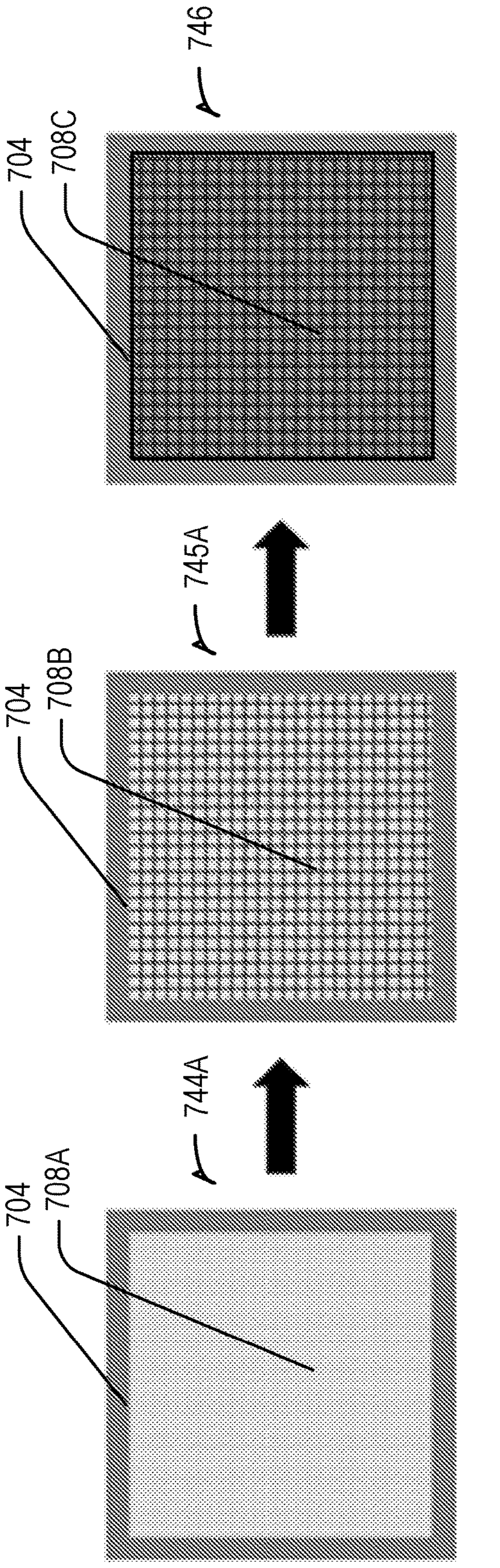
FIG. 7A illustrates generally an example comprising a processing flow where an active material is applied to a bipolar plate substrate in paste form and the active material is patterned either during or after application to the bipolar plate substrate, and the paste material is cured.
Figure 7B:
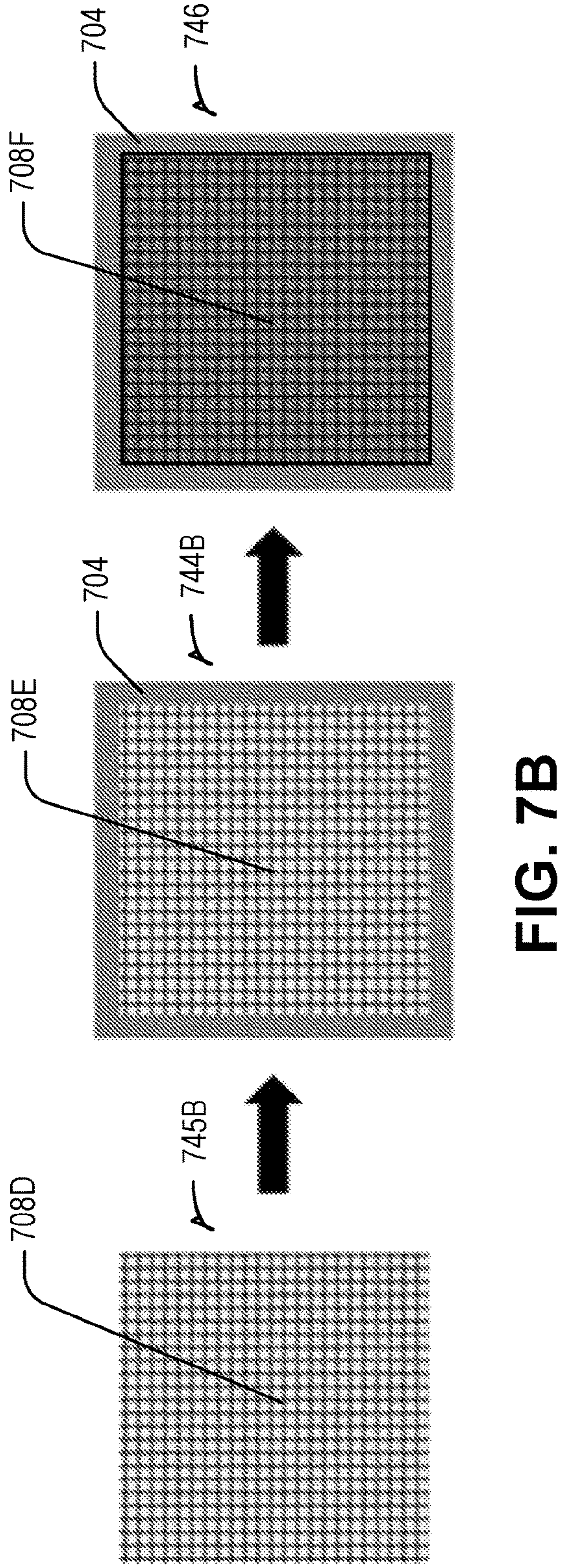
FIG. 7B illustrates generally an example comprising a processing flow where an active material in paste form is patterned prior to application to a bipolar plate substrate, and the paste material is cured.

FIG. 7A illustrates generally an example comprising a processing flow where an active material 708A is applied to a bipolar plate substrate 704 in paste form at 744A and the active material 708B is patterned either during or after application to the bipolar plate substrate 704 at 745A, and the active material 708B is cured at 746 such as via thermal treatment of the pasted substrate 704, to provide a bipolar plate assembly having a cured patterned active material 708C. FIG. 7B illustrates generally an example comprising a processing flow where an active material 708D in paste form is patterned at 745B prior to application to a bipolar plate substrate 704 at 744B, and then the paste material 708E is cured at 746 such as via thermal treatment of the pasted substrate 704 as discussed elsewhere herein, to provide a bipolar plate assembly having a cured patterned active material 708F. Other variations are possible, such applying and patterning the paste using a support or web other than the current collector or using patterns other than the mesh pattern shown in FIG. 7A and FIG. 7B. For example, other shapes such as dimples, impressions, diagonal or non-parallel lines, or (semi) random patterns may be used, such as by scoring, pressing, stamping, cutting, or molding, as illustrative examples.

Figure 8:
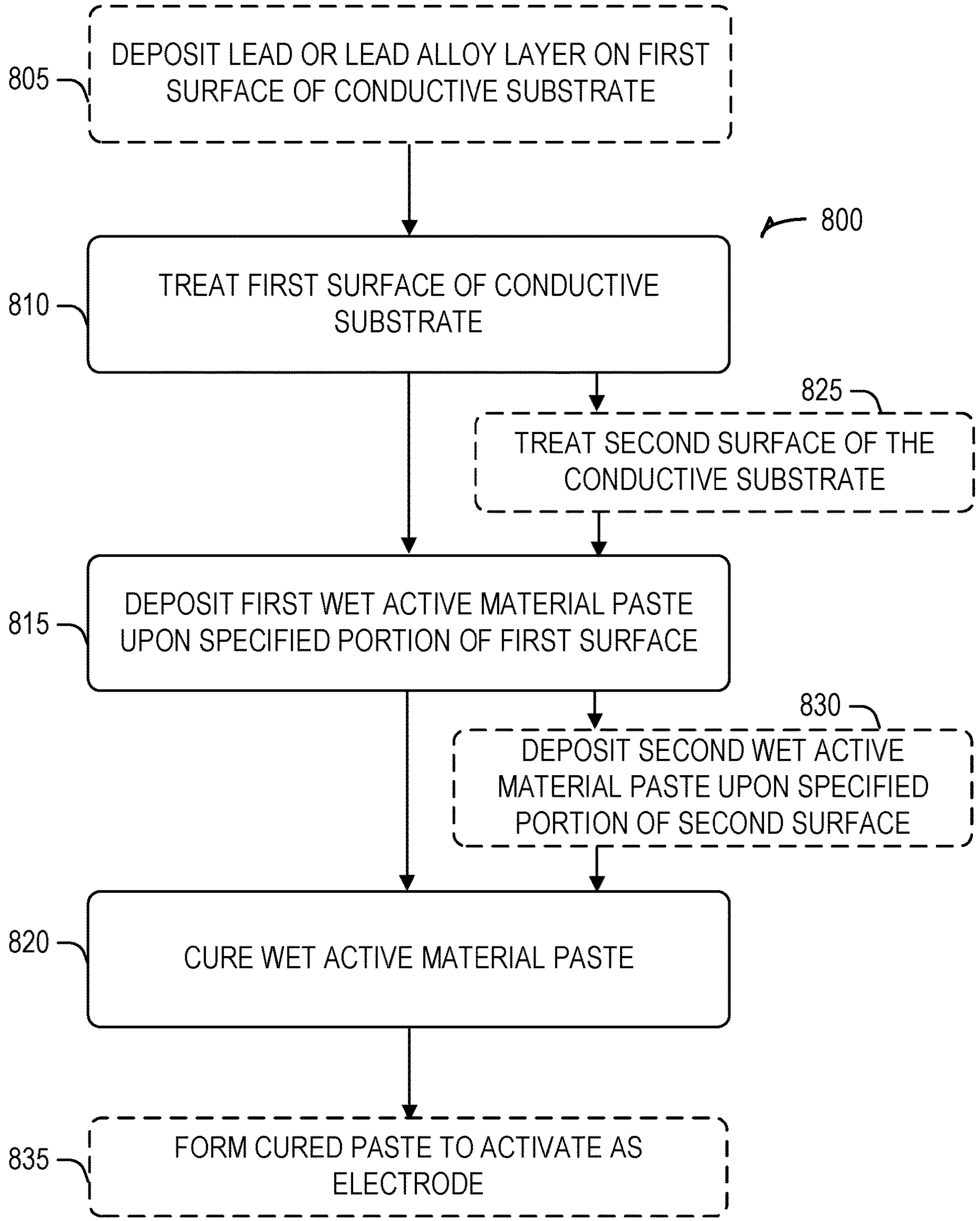
FIG. 8 illustrates generally a technique, such as a method, for providing a bipolar battery plate having at least one active material layer.

FIG. 8 illustrates generally a technique, such as a method 800, for providing a bipolar battery plate having at least one active material layer. At 810, a first surface of a conductive substrate can be treated, such as described elsewhere herein (e.g., including one or more of washing, etching, roughening, embossing, or combinations thereof). At 815, a first wet active material paste can be deposited upon a specified portion of the first surface. For example, such deposition can include dispensing, screen printing, extruding, or other deposition techniques. As mentioned above, water or an acid solution can be applied before, during, or after deposition, such as at the interface between the wet active material paste and the conductive substrate. At 820, the wet active material paste can be cured, such as using a controlled temperature or humidity profile versus time for an environment used for such curing. At 835, the cured paste can be "formed" such as after assembly within a bipolar battery assembly by providing a specified electrical stimulus to terminals of the battery assembly. At 805, prior to deposition of the wet active material, a lead or lead alloy layer (e.g., a tin-lead blend such as a eutectic blend) can be deposited on the first surface of the conductive substrate, such as by plating, application of a foil, or a coating process. At 825, a second surface of the conductive substrate opposite the first surface can be treated, such as in a manner similar to the treatment at 810 or contemporaneously with such treatment at 810. At 830, a second wet active material paste can be deposited upon a specified portion of the second surface, such as in a manner similar to deposition of the first active material paste at 815 using a paste composition for a battery electrode having an opposite conductivity type as compared to the first wet active material paste. Optionally, the first and second wet active material pastes can be cured contemporaneously at 820.

Various Notes

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for providing a bipolar battery plate having at least one active material layer, the method comprising:
- treating a first surface of a conductive substrate, the first surface comprising lead or a lead alloy;
- depositing a first wet active material paste upon a specified portion of the treated first surface, the first wet active material paste comprising lead or a lead oxide;
- patterning the first wet active material paste after deposition; and
- curing the first wet active material paste to provide an electrode having first conductivity type for the bipolar battery plate;
- wherein the bipolar battery plate is located in a stack of other respective bipolar battery plates, where respective bipolar battery plates are isolated from each other by a separator having controlled porosity at least during the curing.

2. The method of claim 1, wherein the conductive substrate comprises an ohmic contact layer comprising a silicide; and
- wherein the first surface comprising the lead or the lead alloy is located upon the ohmic contact layer, the lead or the lead alloy forming an adhesion layer.

3. The method of claim 2, wherein the lead or lead alloy is applied to the ohmic contact layer using at least one of a plating process or a coating process.

4. The method of claim 1, wherein the first wet active material paste is patterned to provide stress-relief features that regulate cohesion of the first wet active material.

5. The method of claim 4, wherein the first wet active material paste is patterned at least in part using a support web other than the conductive substrate.

6. The method of claim 1, wherein the first wet active material paste is also patterned prior to deposition of the first wet active material paste upon a specified portion of the treated first surface.

7. The method of claim 1, wherein treating the first surface of the conductive substrate comprises etching or roughening the first surface.

8. The method of claim 1, wherein treating the first surface comprises embossing or otherwise stamping the first surface.

9. A method for providing a bipolar battery plate, the method comprising:
- treating a first surface of a conductive substrate, the first surface comprising lead or a lead alloy;
- treating a second surface of the conductive substrate opposite the first surface, the second surface comprising lead or a lead alloy;
- depositing a first wet active material paste upon a specified portion of the treated first surface, the first wet active material paste comprising lead;
- depositing a different second wet active material paste upon a specified portion of the treated second surface, the second wet active material paste comprising lead dioxide; and
- curing the first wet active material paste and the second wet active material paste contemporaneously to provide a first battery electrode having a first conductivity type upon the first surface and a second battery electrode having an opposite second conductivity type upon the second surface;
- wherein the bipolar battery plate is located in a stack of other respective bipolar battery plates, where respective bipolar battery plates are isolated from each other by a separator having controlled porosity at least during the curing; and
- wherein pressure is applied to place a stack of the respective bipolar battery plates in compression at least during the curing.

10. The method of claim 9, wherein the first surface comprising the lead or the lead alloy is located upon a first ohmic contact layer;
- wherein the second surface comprising the lead or the lead alloy is located upon a second ohmic contact layer.

11. The method of claim 9, wherein pressure is applied to place a stack of respective bipolar battery plates in compression at least during the curing to form corrosion layers while the bipolar plates are isolated from each other by the separators having controlled porosity.

12. The method of claim 9, wherein the bipolar battery plate is separated from the other respective bipolar battery plates after curing.

13. The method of claim 9, wherein at least one of the first wet active material paste or the second wet active material paste is patterned prior to the curing.

14. The method of claim 9, comprising patterning the first wet active material paste after deposition.

15. The method of claim 14, wherein the first wet active material paste is patterned to provide stress-relief features that regulate cohesion of the first wet active paste.

16. A method for providing a bipolar battery plate, comprising:
- forming a conductive substrate;
- forming an ohmic contact layer upon a first surface of the substrate;
- forming an adhesion layer upon the ohmic contact layer, the adhesion layer comprising lead or a lead alloy;
- depositing a first wet active material paste upon a specified portion of the first surface, the first wet active material comprising lead or a lead oxide, the first wet active material paste including a patterned surface or profile; and curing the first wet active material paste including using multiple phases of curing defining different environmental conditions including varying at least one of temperature or humidity during a respective phase to form a corrosion layer, with at least two phases including elevated temperature versus ambient, the curing to provide an electrode having first conductivity type for the bipolar battery plate;

wherein the bipolar battery plate is located in a stack of other respective bipolar battery plates, where respective bipolar battery plates are isolated from each other by a separator having controlled porosity at least during the curing.

17. The method of claim 16, comprising wetting a surface of at least one of the adhesion layer or the first wet active material paste prior to deposition of the first wet active material paste.

18. The method of claim 16, wherein the bipolar battery plate is located in a stack of other respective bipolar battery plates, where respective bipolar battery plates are isolated from each other by a separator at least during the curing; and wherein pressure is applied to place a stack of the respective bipolar battery plates in compression at least during the curing.

19. The method of claim 16, wherein the patterned surface or profile provides stress-relief features that regulate cohesion of the paste.

* * * * *